April 28, 1931. J. SLEPIAN 1,802,677
ELECTRIC POWER TRANSLATING DEVICE
Original Filed Jan. 2, 1924  2 Sheets-Sheet 1
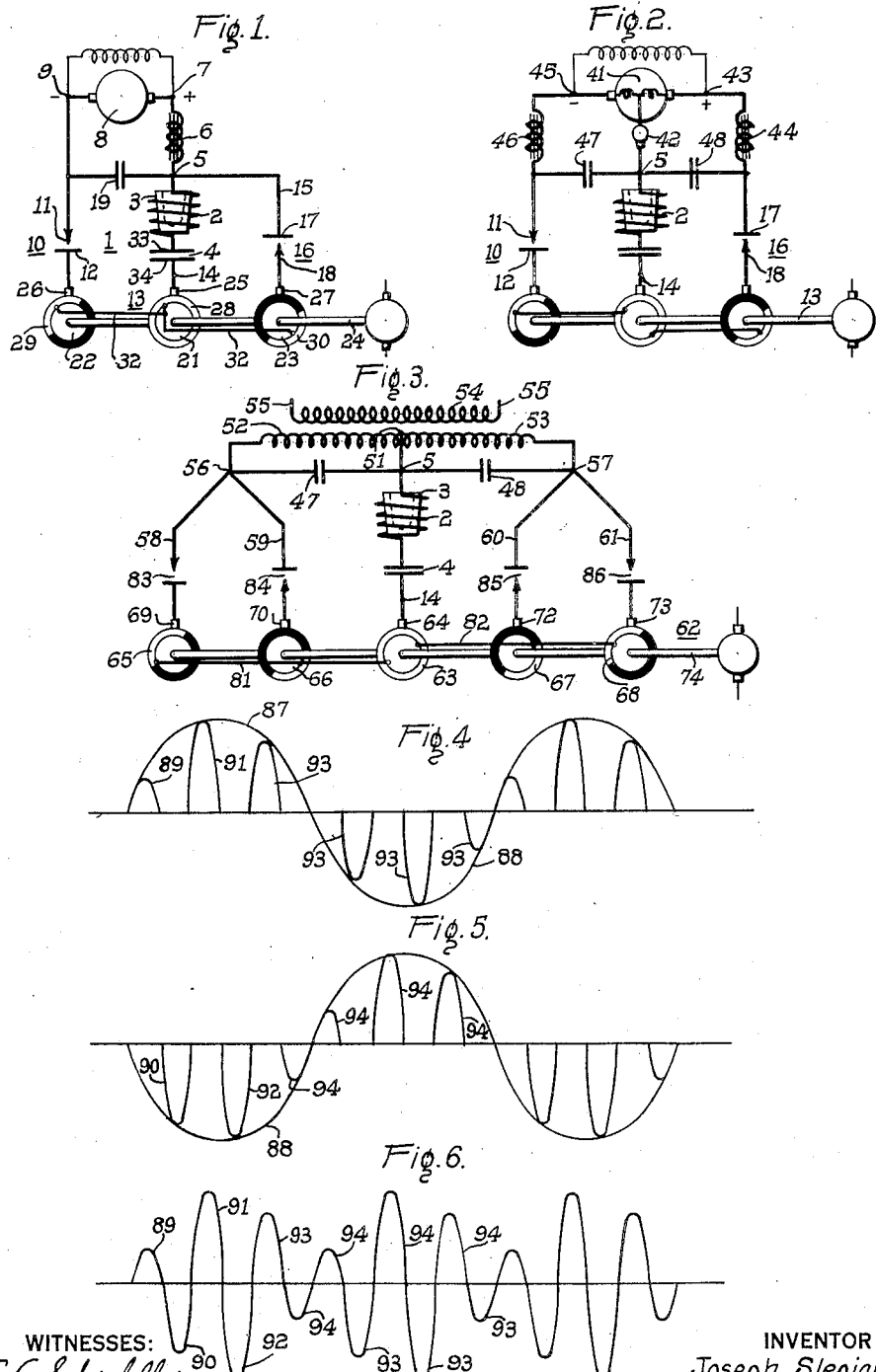
WITNESSES:
A.G. Schiefelbein.
S. M. Pineles
INVENTOR
Joseph Slepian.
BY
Wesley G. Carr
ATTORNEY April 28, 1931. J. SLEPIAN 1,802,677
ELECTRIC POWER TRANSLATING DEVICE
Original Filed Jan. 2, 1924  2 Sheets-Sheet 2
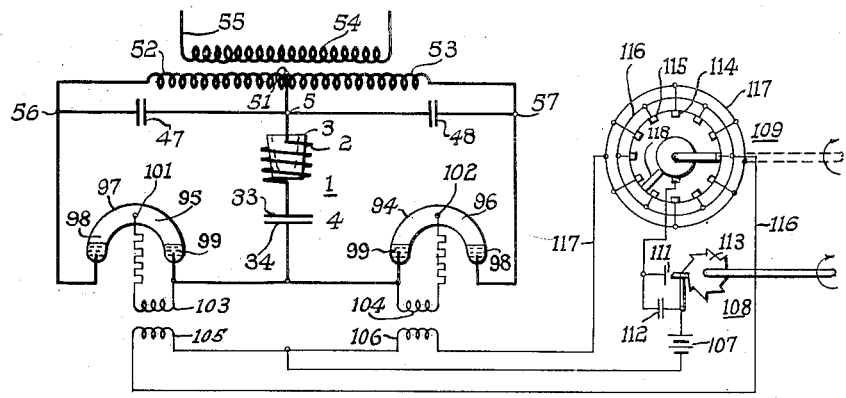
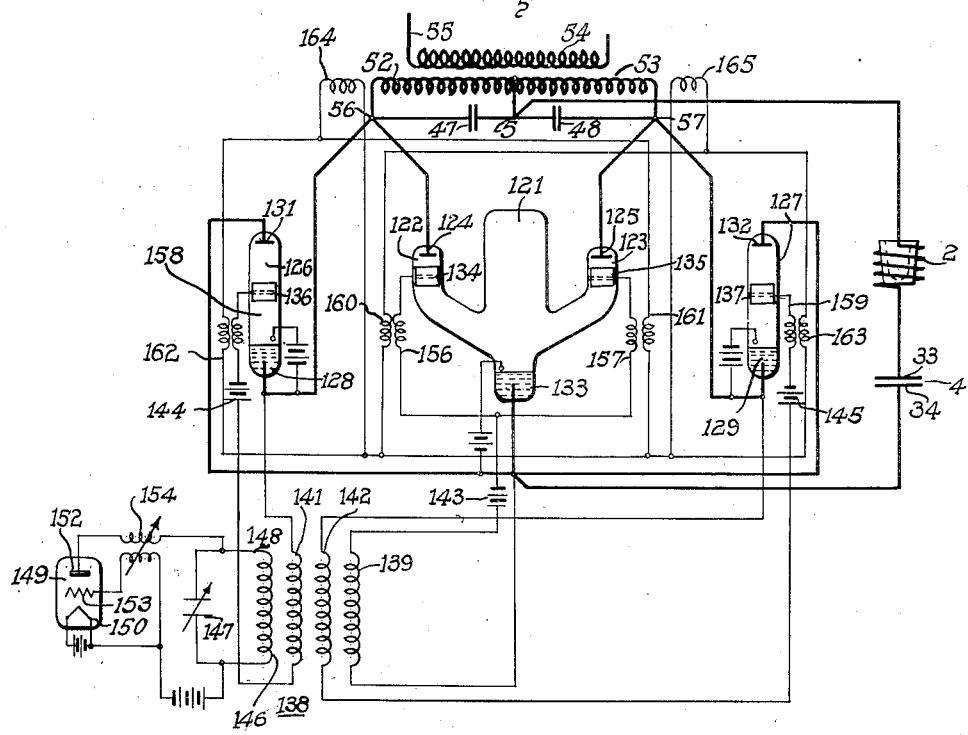
WITNESSES:
AG Schiefelbein
S. M. Pineles
INVENTOR
Joseph Slepian.
BY
Wesley G. Carr
ATTORNEY Patented Apr. 28, 1931

1,802,677

UNITED STATES PATENT OFFICE

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA

ELECTRIC-POWER-TRANSLATING DEVICE

Application filed January 2, 1924, Serial No. 684,062. Renewed September 12, 1929.

My invention relates to electric translating apparatus, and it has particular relation to apparatus for translating currents of one frequency into currents of another frequency.

One object of my invention is to provide improved apparatus utilizing unidirectionally conducting means for translating direct current into alternating current.

Another object of my invention is to provide improved apparatus utilizing unidirectionally conducting space-current valves for converting electrical energy of a low frequency into electrical energy of a high frequency.

A further object of my invention is to provide apparatus utilizing mercury-arc rectifiers for transforming currents of one frequency into another, the rectifiers being so arranged as to most efficiently utilize the characteristic properties thereof.

A more specific object of my invention is to provide a double half-wave inverted rectifier wherein the customary transformer having a mid-tap is dispensed with and a mechanical commutator means or other current-controlling device is substituted therefor in order to prevent the short-circuiting of the direct-current source through the two rectifiers.

In practicing my invention, I supply energy to an oscillating circuit comprising a serially connected rectifier and means for opening and closing a circuit in accordance with the frequency of the desired alternating currents. Since, by reason of the rectifier being connected in the oscillating circuit, only currents of one-half wave of the oscillations can pass therethrough, I provide a similar rectifier circuit shunting the path which cannot be traversed by the currents of the second half wave, permitting such currents to utilize the same for the second half wave of oscillations. By controlling the operation of the circuit-closing means which are connected in series with the rectifiers, or in other arrangements are combined with the rectifier in one unit, I am able to vary the frequency of the oscillations over a wide range without making adjustments in the elements of the oscillating circuit, that is, in the condenser and inductance apparatus provided in the circuit. Such organizations are of particular importance in large power, high-frequency applications such as industrial induction furnaces, or wireless transmission of energy, although the novel features of my invention are not confined to such applications only.

With the foregoing and other objects in view, my invention consists in the combinations, circuit connections and methods of operation described and claimed herein and illustrated in the accompanying drawing, wherein Figure 1 is a circuit diagram of a simple organization embodying my invention;

Fig. 2 is a circuit diagram of a more elaborate system for converting direct current into alternating current;

Fig. 3 is a circuit diagram of a system for converting alternating current of a low frequency into alternating current of a high frequency;

Figs. 4, 5 and 6 are curves illustrating the operation of the system shown in Fig. 3;

Fig. 7 is a circuit diagram of a system operating in accordance with the principles utilized in the apparatus illustrated in Fig. 3, and employing mercury-arc valves with ignition control; and Fig. 8 is a circuit diagram of a system employing the same principles as those utilized in the apparatus shown in Fig. 3 and provided with grid-controlled mercury-arc rectifiers.

In Fig. 1 is shown an electric oscillator 1 comprising an inductance coil 2 surrounding a crucible 3 containing a metallic mass which is to be molten by currents induced therein by current oscillations in the inductance coil 2. A serially connected oscillating condenser 4 is connected to one terminal of the coil 2. The other terminal 5 of the coil 2 is connected, through a stabilizing inductance 6, to the positive pole 7 of a shunt-excited direct-current generator 8. The negative pole 9 of the direct-current generator is connected, through a rectifier 10 having a cathode 11 and an anode 12, to a switching device 13 for closing and opening a circuit connection between the anode 12 of the rectifier and the free terminal 14 of the oscillating condenser.

The oscillator 1 just described is shunted by a circuit 15 comprising a rectifier 16 having its anode 17 connected to the free terminal 5 of the inductance coil 2. The cathode 18 of the rectifier 16 may be connected to the free terminal of the oscillating condenser 4 through the operation of the same switching device 13 which controls the circuit connection between the condenser 4 and the anode 12 of the other rectifier 10.

A bridging condenser 19 is shunted between the free terminal 5 of the oscillating inductance coil 2 and the negative terminal 9 of the direct-current source, permitting a substantially undisturbed passage of alternating currents, but preventing a closed circuit between the terminals of the direct-current generator 8.

The switching device 13 may consist of three annular contact members 21, 22 and 23, respectively, mounted upon a motor-driven shaft 24 and co-operating with brushes 25, 26 and 27 for providing connections between the free terminal 14 of the oscillating condenser 4 and the anode 12 and cathode 18 of the rectifiers 10 and 16, respectively.

The contact member 21 co-operating with the brush 25 leading to the condenser 4 is provided with a conducting member or slip-ring 28 covering the entire periphery. The other two contact members 22 and 23 are provided with segmental conducting members 29 and 30 co-operating with the brushes 26 and 27, respectively, and extending over only a portion of the periphery. The relative positions of the conducting segments 29 and 30 are such that contact is established, through conductors 32 leading from the conducting segment 28 to the conducting segments 29 and 30, respectively, between the brush 25, which is connected to the condenser 4, and the brushes 26 and 27, which are connected to the rectifiers 10 and 16, respectively, during alternate half revolutions of the shaft 24. The realtive widths of the brushes 26 and 27, and of the conducting segments 29 and 30 co-operating with the brushes, respectively, are so chosen that the connection to one rectifier is positively interrupted before the connection to the other rectifier is established.

The operation of the embodiment illustrated in Fig. 1 may be understood by considering the current conditions at the moment wherein the switching device 13 is in the position illustrated in the drawing. A circuit is established from the free terminal 5 of the oscillating inductance coil 2, through the generator 8, negative terminal 9, thence through the cathode and anode of the rectifier 10, through the brush 26, the contact segment 29, the conductor 32, the slip-ring 28 and the brush 25 of the free terminal 14 of the oscillating condenser. A current flows through this circuit from the generator and charges up the condenser 4, the condenser plate 33, which is connected to the inductance coil, having a positive charge, and the condenser plate 34, which is connected to the brush 25, having a negative charge.

The sizes of the inductance device 2, the oscillating condenser 4 and the bridging condenser 19 are so chosen that the charging process is at an end before the brush 26 leaves contact with the co-operating conducting segment 29 and interrupts the connection between the anode 12 of the rectifier and the negatively charged condenser plate 34 of the condenser 4. By such an arrangement, I secure absolutely sparkless opening of the contacts between the elements of the switching device 13, reducing the duty of the same and thus permitting operation on large power with relatively simple equipment.

In the further course of rotation of the shaft 24, a contact is established between the brush 27 and the co-operating contact segment 30 of the other rectifier 16, thereby establishing a conducting circuit connection between the negatively charged condenser plate 34 and the cathode 18 of the rectifier 16. The latter connection permits the electric charge, which was trapped upon the condenser during the former half of the rotation of the shaft 24, to discharge through the rectifier 16, until all of the positive charge has passed from the positively charged condenser plate 33 through the inductance coil 2, the anode 17 and cathode 18 of the rectifier 16, the brush 27, the conducting segment 30, the conductor 32 and the brush 25 to the formerly negatively charged condenser plate 34.

The positive charge, which is thus flowing towards the lower condenser plate 34, is trapped thereon and cannot return through the rectifier 16 on account of the unidirectional properties thereof, but remains trapped in the condenser until the contact between the conducting segment 30 and the brush 37 is opened and the connection through the other rectifier 10 is again closed. This cycle is thus repeated in accordance with the speed of rotation of the shaft 24 and by regulating this speed the periodicity of the flow of current through the inductance 2 may be varied within relatively wide limits. For the most efficient operation, it is desirable to make the frequency of the switching operations somewhat smaller than the natural frequency of the oscillating circuit so that the current flow is each time at an end just before the switching contacts are opened.

The system illustrated in Fig. 2 is, in principle, similar to that illustrated in Fig. 1 and utilizes an organization wherein energy is supplied to the oscillation during each half wave. The three-wire direct-current generator 41 has its neutral terminal 42 connected to the free terminal 5 of the inductance coil 2. The positive terminal 43 of the direct-current generator is connected, through a stabilizing inductance 44, to an anode 17 of the rectifier 16. The negative terminal 45 of the direct-current generator is connected, through a stabilizing inductance 46, to the cathode 11 of the rectifier 10. The connections between the free terminal 14 of the oscillating condenser 4 and the anode 12 of the rectifier 10 and the cathode 18 of the rectifier 16 are made in the same manner as in the system illustrated in Fig. 1. Bridging condensers 47 and 48 are connected between the free terminal 5 of the inductance coil 2 and the cathode 11 of the rectifier 10 and the anode 17 of the rectifier 16, respectively.

The operation of the organization illustrated in Fig. 2 is similar to that illustrated in Fig. 1, each half of the generator 41 acting in the same manner as the generator 8 in Fig. 1, serving to charge the oscillating condenser 4 during each half of the oscillation while the switching device 13 provides a circuit connection between the generator half and the condenser.

In Fig. 3 is illustrated an organization of apparatus embodying my invention for converting alternating current of a low frequency into alternating currents of a high frequency. To this end I employ the principle utilized in the organization shown in Fig. 2 and duplicate, to a certain degree, the switching and current-flow directing apparatus so that proper oscillating circuits are provided for each half of the current waves of the alternating-current supply. The free terminal 5 of the oscillating inductance 2 is connected to a neutral terminal 51 of two serially connected transformer windings 52 and 53. Alternating current is supplied to the transformer windings 52 and 53 through a primary winding 54, which is connected to an alternating-current supply line 55.

Two groups of current flow paths are provided from the end terminals 56 and 57 of the transformer windings 52 and 53, respectively, to the free end terminal 14 of the oscillating condenser 4, one pair of circuit connections 58 and 60 corresponding to one half wave of the alternating-current supply and a second pair of circuit connections 59 and 61 corresponding to the second half-wave of the alternating-current supply.

To control the current flow through the several paths, I provide a switching device 62 comprising a slip-ring 63 co-operating with a brush 64 leading to the free terminal 14 of the oscillating condenser 4. The switching device is further provided with two pairs of contact segments 65, 66, 67 and 68, co-operating with brushes 69, 70, 72 and 73 leading to the several paths. The slip-ring and contact segments are mounted on a motor-driven shaft 74.

Conductors 81 provide a conducting connection between the slip-ring 63 leading from the condenser 4 and the conducting segments 65 and 66, respectively, leading to the end terminal 56 of the transformer winding 52.

Conductors 82 provide a similar connection between the slip-ring 63 leading from the condenser 4 and the conducting segments 67 and 68, respectively, leading to the end terminal 57 of the transformer winding 53. The connections between the brushes 69, 70, 73 and 72 and the respective end terminals 56 and 57 of the transformer windings 52 and 53 are accomplished through rectifiers 83, 84, 86 and 85 of alternately opposite polarity. Bridging condensers 47 and 48 are connected between the free terminal of the inductance coil 2 and the end terminals 56 and 57 of the transformer windings 52 and 53, respectively.

It may be seen from the drawing that the transformer windings 52 and 53 in combination with one set of rectifiers 83 and 85 are equivalent to the organization illustrated in Fig. 2 with the transformer terminal 56 constituting the negative terminal of the energy supply, and transformer terminal 57 constituting the positive terminal of the energy supply, and correspond to one half-wave of the alternating-current supply. During the second half-wave of the alternating-current supply, the polarities of the terminals 56 and 57 are reversed and the second set of rectifiers 84 and 86 are in operation. Each set of rectifiers, with the corresponding switching elements such as the contact members 65, 67 and 66, 68, operates during each half wave in the same manner as the apparatus illustrated in Fig. 2.

The current conditions obtaining during such operation are illustrated in Figs. 4, 5 and 6. The curves in Fig. 4 illustrate the current flowing through the left-hand rectifiers 83 and 84; the curves in Fig. 5 illustrate the current in the right-hand rectifiers 85 and 86 and the curves in Fig. 6 illustrate the resultant oscillating current flowing through the inductance 2.

Assuming that the lines 87 in Fig. 4 and the line 88 in Fig. 5 indicate the voltages impressed upon the transformer windings 52 and 53, respectively, and assuming that the shaft 74 is in the position illustrated in the drawing, a current corresponding to curve 89 is flowing from the lower condenser plate of condenser 4 through the rectifier 83, the bridging condenser 47 and the inductance coil 2 to the upper condenser plate of the condenser 4.

During the course of rotation of the shaft 74 of the switching device 62, the contact with the brush 69 is opened and the circuit 58 is sparklessly interrupted. Also, a circuit is completed through the contact member 67 of the circuit 60 leading to the end terminal 57 of the other transformer winding 53. Current corresponding to curve 90 (Fig. 5) now flows from the inductance coil 2 through the condenser 48 the circuit 60 and the rectifier 85 towards the condenser 4. During the next half rotation of the shaft 74, current corresponding to curve 91 again flows from the condenser 4 through the rectifier 83 and the condenser 47 to the inductance coil 2. During the next half rotation, current flowing through the rectifier 85 corresponds to curve 92 (Fig. 5). These current-flow cycles through the rectifiers 83 and 85 continue as long as the same half wave of the impressed voltage 87, 88 lasts.

During the next half period of the impressed voltage, corresponding to the portion of the curves 87 and 88, extending after the curves have passed through the first zero value, the rectifiers 83 and 85 become inoperative and the control of the currents is effected through the second pair of rectifiers 84 and 86 in a similar manner, producing the currents corresponding to the curves 93 and 94. The current flowing through the inductance coil 2, and utilized for heating the contents of the crucible 3, corresponds to the curve illustrated in Fig. 6 and is the sum of the currents corresponding to the Figs. 4 and 5.

The curves illustrated in Figs. 4, 5 and 6, give, in general an approximate picture of the current conditions obtaining in the apparatus.

In Fig. 7 is illustrated an organization for performing the same operations as those which are performed by the organization illustrated in Fig. 3, but dispensing with the separate switching device 62 and utilizing, instead, mercury-arc valves 95 and 96 each performing the combined operation of two rectifiers and the co-operating switching means of Fig. 3.

Each mercury-arc valve comprises an evacuated envelope 97 and two mercury electrodes 98 and 99, respectively. Starting electrodes 101 and 102 are provided in each valve intermediate the mercury electrodes 98 and 99 and are energized by means of secondary windings 103 and 104 of two ignition transformers. The ignition transformers have two serially connected primary windings 105 and 106 for sending therethrough pulsating direct currents operating in a familiar manner to cause discharges between the starting electrodes 101 and 102 and the mercury electrodes, respectively.

The pulsating direct current is derived from a battery 107 by means of an interrupter 108 and is distributed to the transformer windings 105 and 106, respectively, in accordance with the desired control of the current flow by means of a distributor 109. The interrupter 108 comprises two quick-break contacts 111 shunted by a condenser 112 and operated by a toothed, motor-driven cam 113.

The distributor 109 comprises a plurality of annularly disposed contact members 114 and 115 which are alternately connected to two bus conductors 116 and 117 leading to the end terminals of the primary windings 105 and 106 respectively, of the ignition transformers. A distributor arm 118 is rotated to make contact alternately with the contact members 114 and 115 leading to the ignition transformers of the two mercury-arc valves 95 and 96, respectively, thereby causing an alternate energization of the ignition transformers of the two valves. The battery 107 has its negative terminal connected to a point intermediate the two primary windings of the ignition transformers, the positive terminal being connected to the distributor arm 118 of the interrupter 111 through the interrupter 108. Interrupter 108 should open at least once in every period during which arm 118 engages a contact member 114 or 115.

During the short period while the distributor arm 118 is in contact with a contact member of the distributor 109, a pulsating direct current is sent by the interrupter 108 through the corresponding primary winding of the ignition transformers, the pulsating direct inducing, in turn, a high potential between the starting terminal of the ignition transformer and one of the mercury terminals 98 and 99, respectively, of the valve. This induced potential is an alternating one, but is non-sinusoidal because of the fact that the current through the primary windings 105 and 106 is interrupted quickly but is built up at a relatively slow rate. Consequently, one of its half-cycles has a high peak value while the other half-wave is relatively low and flat. The connection of the secondary 103 is made such that electrode 101 is positive relative to electrode 99 during the half-cycle of potential which has the high peak value aforesaid. The value of the potential induced in secondary 103 is so adjusted that the peak value when electrode 101 is positive suffices to cause an arc discharge to electrode 98 or 99 while the low potential prevailing during the half-cycle when 101 is negative to 99 is insufficient to initiate arc discharge. Analogous statements apply to discharges in tube 96.

The high positive potential of either of the starting electrodes 101 and 102 thus causes a discharge between said starting electrodes and the mercury electrode which has the lower potential, depending upon the operation of the apparatus. By considering the voltage conditions obtaining during the operation of the apparatus, it may be found that the discharge between the starting electrode and the mercury electrodes 98, 99 of the valves 95 and 96 will take place in such direction as is desired for the operation.

At one moment, for instance, a voltage is impressed upon the supply transformer winding 52 sending a current from the free terminal 5 of the inductance coil 2 through condenser 47, through the mercury-arc valve 95 from the mercury electrode 98 to the mercury electrode 99 and thence to the oscillating condenser 4, charging the condenser plate 34 to a positive potential. The mercury-arc valve 96 is non-conducting. After the condenser 34 is charged to the full potential as determined by the impressed voltage, the current flowing through the valve 95 is reduced to a low value and the valve becomes non-conductive, representing an open circuit for a discharge in the reverse direction.

In the course of rotation of the distributor arm 118, pulsating current is sent through the transformer winding 106 of the mercury-arc valve which was non-conducting during the previous period, and a high unidirectional potential is impressed upon the starting electrode 102. Since the charge accumulated on the condenser plate 34, leading to the mercury electrode 99 of the valve 96, is positive, and the charge upon the condenser plate 33 leading to the mercury electrode 98 is negative, the potential difference between the starting electrode 102 and the mercury electrode 98 of the tube 96 will be larger than the potential difference between the starting electrode 102 and the mercury electrode 99, thereby causing a discharge between the starting electrode 102 and the mercury electrode 98. The mercury electrode 98 thus becomes an electron-emitting cathode and the positive charge trapped on the condenser 34 discharges through the valve 96 in the direction from the electrode 99 acting as an anode to the electrode 98 which acts as a cathode and thence to the bridging condenser 48 and through the inductance coil 2 to the other plate 33 of the condenser 4. In the meantime, the distributor arm has left the contact with the contact member leading to the ignition transformer 106 of the rectifier 96 and the unidirectional conductivity of the valve 96 is maintained only by reason of the current flowing therethrough.

As soon as the condenser discharge has passed through the valve 96 and the current is reduced to a low value, the valve becomes non-conductive; and a similar action is initiated in the valve 95, by reason of the movement of the distributor arm 118, causing the positive charge, which is now trapped on the upper plate 33 of the condenser 4, to discharge through the valve 95 in the direction from the mercury electrode 98 to the mercury electrode 99 which is now acting as a cathode. The same process repeats itself during the entire operation, the charges which are trapped on the condenser automatically determining the direction of the discharge through the mercury-arc valves.

In Fig. 8 is shown a somewhat different arrangement, wherein the flow of the current, in an organization which is similar to that illustrated in Fig. 3, is effected by means of grid-controlled mercury-arc rectifiers. To this end, I provide a double-wave mercury-arc rectifier 121 having two arms 122 and 123 carrying anodes 124 and 125 respectively, connected to the end terminals 56 and 57 of the transformer windings 52 and 53, respectively. I further provide two single-wave rectifiers 126 and 127 having mercury cathodes 128 and 129, which are connected to the end terminals 56 and 57 of the two transformer windings, respectively. The anodes 131 and 132 of the two single-wave rectifiers 126 and 127 are connected to the mercury electrode 133 of the double-wave rectifier 121. The rectifier arms 122 and 123 of the double-wave rectifier 121 and the two single-wave rectifiers 126 and 127 are provided with control grids 134, 135, 136 and 137, respectively, for controlling the flow of current therethrough.

The details of construction of the grids, as well as the particular characteristics of the control of currents flowing through a mercury-arc rectifier by means of grids, are described and claimed in my copending application Serial No. 668,555, filed Oct. 15, 1923, and an improved grid construction is shown also in an application of V. K. Zworykin and D. Ulrey, Serial No. 665,487, filed Sept. 28, 1923, both assigned to the Westinghouse Electric and Manufacturing Company.

It is pointed out, in my above-mentioned application, that a current flow through a mercury arc rectifier cannot be stopped by the application of a current-blocking potential to an ordinarily-constructed grid disposed in the path of current flow unless the current has been reduced by some other means to a low value. In this respect, the requirements which have to be observed in making application of the grid control features are analogous to those which are met in the control of the current flow by switching devices, such as are utilized in the arrangements shown in Figs. 1, 2 and 3, where it was desirable to rec ace the current through the rectifiers to substantially zero before the control switches opened, in order to prevent arcing and excessive wear of the switching contacts. With this in view, the arrangement illustrated in Fig. 8 is practically a duplication of that illustrated in Fig. 3 with the control of the grids 134, 135, 136 and 137 substituted for the operation of the switching device 62.

The potential of the grids may be controlled in any well-known manner, for instance, by means of a grid-control transformer 138 comprising a secondary transformer winding 139 for the control of the grids in the double-wave rectifier 121 and two secondary transformer windings 141 and 142 for controlling the grids in the single-wave rectifiers 126 and 127.

The transformer winding 139 has one terminal connected to the mercury electrode 133 of the double-wave rectifier 121, the other terminal leading through a biasing battery 143 to the two grids 134 and 135. The transformer winding 141 is connected, in opposite direction to the transformer winding 139, between the mercury electrode 128 and the grid 136 of the rectifier 126 with a biasing battery 144 included in the control circuit. The transformer winding 142 is similarly connected between the mercury electrode 129 and the grid 137 of the second single-wave rectifier 127 with a biasing battery 145 included in the circuit. A control voltage is impressed upon the transformer windings 139, 141 and 142 through a primary winding 146, which is included with a condenser 147 in an oscillating circuit 148. Oscillations are maintained in the oscillating circuit 148 by means of a three-electrode tube 149 comprising a filament 150 and a plate or anode 152 connected respectively to two terminals of the oscillating circuit 148, through a plate battery, and a grid 153 which is coupled to the plate circuit by means of a feed-back transformer 154.

The operation of the organization illustrated in Fig. 8 may be understood by considering the conditions obtaining at a certain point in the operation and following cycle from this point. Assuming, for instance, that the supply line 55 is impressing upon the transformer windings 52 and 53 a voltage tending to send a current in the direction from the terminal 56 through the transformer windings 52 and 53 to the terminal 57, a current may flow from the condenser plate 34 to the anode 131 of rectifier 126, thence through the rectifier to end terminal 56, thence through the bridging condenser 47, the terminal 5 and the inductance coil 2 to the second plate 33 of the condenser 4, charging the latter plate to a positive potential.

As soon as the condenser 4 has been charged to the full potential, the current through the rectifier 126 is reduced to zero, but no discharge can take place in opposite direction, on account of the unidirectional character of the rectifier 126, which prevents a reverse current. During this period, the grid transformer 138 impresses a positive potential upon the grids 136 and 137 of the rectifiers 126 and 127 and a negative potential upon the grids 134 and 135 of the double-wave rectifier 121. After a period of time, which is determined by the frequency of the oscillating circuit 148, the positive potential is applied to the grids 134 and 135 while a negative potential is applied to the grids 136 and 137.

Since the current through the rectifier 126 was reduced to zero shortly before the application of a negative potential to the grid, the rectifier 126 became nonconducting in either direction and it acts as an open circuit. The grid 137 of the second single-wave rectifier 127 becomes similarly negatively charged, rendering that rectifier nonconducting, but we do not have to consider the conditions obtaining in that rectifier since it does not take part in the operation during the half-wave of the alternating current supply, during which the terminal 57 acts as a positive terminal of the supply. The condenser 4 now discharges its accumulated charge from the condenser plate 33 through the bridging condenser 48 thence through the rectifier arm 123 and the mercury electrode 133 to the second condenser plate 34. This cycle of operation repeats itself in the same manner as in the organization illustrated in Fig. 3.

I may so control the oscillating circuits constituted by the two pairs of rectifier paths, 126, 123 and 122, 127 respectively as to make either the one or the other pair of the rectifier paths entirely non-conductive in accordance with the alternations of the voltage of the supply line 55. To this end I provide, for instance, in series with the grids 134 to 137 additional control transformers 156 to 159 respectively having primary windings 160 to 163 respectively, which are pairwise connected to two auxiliary transformer windings 164 and 165, of the main supply transformer 54. One of the auxiliary transformer windings 164 supplies the additional control transformers 157 and 158 which are connected in series with the control grids 135 and 136, respectively, of the rectifier path used during one-half alternation of the supply voltage. The connections are so made that the voltage induced in the additional transformers 157 and 158 during one half alternation biases the two grids 135 and 136, respectively, to a potential at which the same are effectively controlled by the grid control transformer 138 in the manner described hereinbefore. During the second half alternation, the voltage induced in the additional transformers 157 and 158 is of opposite direction and biases the two grids 135 and 136 to a highly negative potential, so that the rectifier paths 123 and 126, respectively, controlled by the two grids remain non-conductive irrespective of the operation of the grid control transformer.

The two additional transformers 156 and 159 of the other pair of rectifier-paths 122 and 127, respectively, are similarly connected to the second auxiliary winding 165 of the main supply transformer 54 in order to bring the rectifier paths into the control of the grid control transformer 138 or make the same entirely non-conductive during successive half alternations of the supply voltage, respectively.

I employ the term "oscillation generator" herein to denote a device at the terminals of which there is produced a periodically alternating potential difference. These alternations need not vary as pure sine functions of time; nor even as the product of a sine function and an exponential term.

My invention is not limited to the precise details, arrangements and methods of operation described in this specification, but may be practically embodied in many other ways without departing from the spirit thereof, and it is my desire, therefore, that all such embodiments be covered by the appended claims.

I claim as my invention:

1. The method of supplying an alternating-current load from an oscillation generator comprising a source of electromotive force serially connected inductance and condenser means and two unidirectional current paths of opposite polarity, which comprises connecting said condenser to said source through one of said paths, opening the circuit between said condenser and said source after the current therebetween has fallen to zero, and then connecting said condenser to discharge through said other path.

2. The combination with an oscillator comprising a serially connected condenser means and inductance means, of a charging means for said condenser comprising a source of energy shunted by a condensance and serially connected with unidirectionally conducting means across said oscillator, and a discharge path connected across said oscillator.

3. The combination with an oscillator comprising condenser means, of a source of energy shunted by a condensance and serially connected with an asymmetrical conductor across said oscillator, and a second asymmetrical conductor connected in opposite direction in a circuit shunting said oscillator.

4. The combination with a source of supply having a neutral terminal and two end terminals, condenser means connected between the neutral terminal and each end terminal, two serially connected rectifier means connected between said end terminals, and an alternating-current load comprising condenser means connected between said neutral terminal and a point intermediate said rectifier means.

5. The combination with a source of energy having a neutral terminal and two end terminals, two serially connected rectifier means connected between said end terminals, an alternating-current load comprising condenser means connected between said neutral terminal and a point intermediate said rectifier means, and alternating-current by-pass means shunting said source of energy.

6. The combination with an oscillator comprising condenser means, of a source of energy and a serially connected asymmetrical conductor connected across said oscillator, a second asymmetrical conductor connected in opposite direction in a circuit shunting said oscillator, and serially acting means associated with each asymmetrical conductor for preventing the flow of current therethrough at times.

7. The combination with an oscillator comprising condenser means, of a source of supply and a serially connected rectifier means connected across said oscillator, a second rectifier means connected in opposite direction in a circuit which is shunt-connected with respect to said oscillator, serially acting circuit-interrupting means associated with each rectifier means and means for so operating said circuit interrupting means that each circuit is opened after the current therethrough is reduced to substantially zero.

8. The combination with an oscillator comprising condenser means, of a source of energy and serially connected rectifier means connected across said oscillator, a second rectifier means connected in opposite direction in a circuit which shunts said oscillator, serially acting circuit-interrupting means associated with each rectifier means, and means for so operating said circuit interrupting means that only one of said circuits can be closed at the same time.

9. The combination with an alternating-current source, of a transformer winding supplied from said source, condensance shunting said winding, two serially connected rectifier means connected to two end terminals of said transformer winding, and an alternating current load of a higher frequency comprising condenser means connected between a point intermediate said rectifier means and a point intermediate said end terminals.

10. The combination with a low frequency alternating current source, of a transformer winding supplied from said source, two serially connected rectifier means connected to the end taps of said transformer winding, a high-frequency alternating current load comprising condenser means connected between a point intermediate said rectifier means and a point on said transformer intermediate said end taps, and circuit interrupting means serially associated with each of said rectifier means, respectively.

11. The combination with a relatively low frequency alternating-current source, of a transformer winding supplied from said source, two serially connected rectifier means connected to the end taps of said transformer winding, a relatively high frequency alternating-current load comprising condenser means connected between a point intermediate said rectifier means and a point on said transformer intermediate said end taps, circuit interrupting means serially associated with each of said rectifier means, respectively, and means for actuating said circuit interrupting means for alternately closing the circuit through one and the other of said rectifier means, respectively.

12. The method of supplying an alternating-current load from an oscillating generator comprising a source of electro-motive force, serially connected inductance and condenser means, and two vapor electric current paths of opposite polarity, which comprises connecting said condenser to said source through one of said paths, opening the circuit between said condenser and said source after the current therebetween has fallen to zero, and then connecting said condenser to discharge through said other path.

13. The combination with an oscillator comprising condenser means, of a source of energy shunted by a condenser and serially connected with a vapor electric rectifier across said oscillator, and a second vapor electric rectifier connected in opposite direction in a circuit which shunts said oscillator.

14. The combination with an oscillator comprising condenser means, of a source of energy and serially connected vapor electric rectifier means connected across said oscillator, a second vapor electric rectifier means connected in opposite direction in a circuit which shunts said oscillator, serially acting circuit interrupting means associated with each rectifier means, and means for so operating said circuit interrupting means that only one of said circuits can be closed at the same time.

15. The combination with a low-frequency alternating-current source, of a transformer winding supplied from said source, two serially connected vapor electric rectifier means connected to the end taps of said transformer winding, a high-frequency alternating-current load comprising condenser means connected between a point intermediate said rectifier means and a point on said transformer intermediate said end taps, and circuit-interrupting means serially associated with each of said rectifier means, respectively.

16. The method of supplying an alternating-current load from a source of electro-motive force and two serially connected unidirectional current paths of opposite polarity shunted by a condenser means which includes connecting said condenser means to said source through one of said paths, opening the circuit between said condenser means and source after the current therebetween has fallen to zero and connecting said condenser means to discharge through said other path.

17. The combination with an oscillator comprising a serially connected condenser means and an inductance means, of means for causing the periodic discharge of said condenser means including a unidirectional conducting gaseous discharge device connected in shunt relation with said condenser means and provided with a control electrode, and means for causing said control electrode to become alternately positive and negative in potential with respect to the cathode of said gaseous discharge device.

In testimony whereof, I have hereunto subscribed my name this 27th day of December, 1923.

JOSEPH SLEPIAN.